US005788857A

United States Patent [19]

Yang et al.

[11] Patent Number: 5,788,857
[45] Date of Patent: Aug. 4, 1998

[54] HYDROXYIMINO ALKYLENE PHOSPHONIC ACIDS FOR CORROSION AND SCALE INHIBITION IN AQUEOUS SYSTEMS

[75] Inventors: Bo Yang; Jiansheng Tang, both of Naperville, Ill.

[73] Assignee: Nalco Chemical Company, Naperville, Ill.

[21] Appl. No.: 735,755

[22] Filed: Oct. 23, 1996

[51] Int. Cl.$^6$ .................. C02F 5/14; C02F 5/00; C23F 11/00; C09K 5/00
[52] U.S. Cl. .................. 210/700; 210/699; 252/180; 252/181; 252/389.22; 252/389.61; 252/389.62; 422/15; 422/16
[58] Field of Search .................. 252/389.22, 389.62, 252/180, 181, 389.61; 210/699, 700; 422/15, 16

[56] References Cited

U.S. PATENT DOCUMENTS

| | | | |
|---|---|---|---|
| 3,617,576 | 11/1971 | Kerst | 210/58 |
| 3,957,160 | 5/1976 | Plöger | 210/58 |
| 4,088,678 | 5/1978 | Matt et al. | 260/502.4 |
| 4,246,103 | 1/1981 | Block et al. | 210/699 |
| 4,892,679 | 1/1990 | Blum et al. | 562/21 |
| 4,980,128 | 12/1990 | Cuisia et al. | 422/16 |
| 5,096,595 | 3/1992 | Hwa et al. | 210/700 |
| 5,167,866 | 12/1992 | Hwa et al. | 252/389.22 |
| 5,259,974 | 11/1993 | Chen et al. | 210/700 |
| 5,414,112 | 5/1995 | Dragisich | 562/12 |
| 5,478,476 | 12/1995 | Dragisich | 210/700 |
| 5,589,106 | 12/1996 | Shim et al. | 252/387 |
| 5,658,464 | 8/1997 | Hann et al. | 210/697 |

FOREIGN PATENT DOCUMENTS 0439142  1/1991  European Pat. Off.

OTHER PUBLICATIONS

Concise Encyclopedia Chemistry, Walter de Gruyter, Berlin, p. 57, 1994.

A Novel Non–Heavy Metal Cooling Water Treatment Effective Under Stagnant or Low Flow Conditions, Hartwick/Chalut/Jovancicevic/Corrosion/93, No. 266, NACE, (1993).

Characterization of Pitting Corrosion on Refinery heat Exchangers, Hartwick/Richardson/Jovancicevic/Peters, Corrosion/94, No. 517, NACE, (1994).

Metal Complexes of N–Hydroxy–imino–di–α–propionic Acid and Related Ligands,West German Patent 1,159,634, Inorganic Chimica Acta, Vol. 93, (1984) 101–108.

*Primary Examiner*—Joseph K. McKane
*Assistant Examiner*—Deanna Baxam
*Attorney, Agent, or Firm*—Elaine M. Ramesh; Thomas M. Breininger

[57] ABSTRACT

This invention relates to the use of iminoalkylenephosphonic acids to prevent corrosion, including both localized corrosion and general corrosion on iron based metal surfaces in contact with a corrosive system water in an aqueous system. The invention also relates to the use of the iminoalkylenephosphonic acids to control formation, deposition and adherence of scale at the surfaces of metals in contact with a scale-forming system water in an aqueous system.

26 Claims, No Drawings

HYDROXYIMINO ALKYLENE PHOSPHONIC ACIDS FOR CORROSION AND SCALE INHIBITION IN AQUEOUS SYSTEMS

FIELD OF THE INVENTION

This invention relates to the use of iminoalkylenephosphonic acids to prevent corrosion, including both localized corrosion and general corrosion on iron based metal surfaces in contact with a corrosive system water in an aqueous system. The invention also relates to the use of the iminoalkylenephosphonic acids to control formation, deposition and adherence of scale at the surfaces of metals in contact with a scale-forming system water in an aqueous system.

BACKGROUND OF THE INVENTION

Ferrous metals such as carbon steel are among the most commonly used structure materials in industrial systems. It is generally known that in industrial systems having a ferrous metal in contact with an aqueous solution, corrosion (both general and localized corrosion) of the metal is one of the major problems. Loss of the metals from surfaces resulting from general corrosion causes deterioration of the structure integrity of the system or structure because of reduction of mechanical strength. It can also cause problems, such as underdeposit corrosion, heat transfer hindrance or even blockage of the flow lines, in other parts of the systems due to the transport and accumulation of corrosion products in areas with low flow rates or geometric limitations. Localized corrosion (e.g., pitting ) may pose even a greater threat to the normal operation of the system than general corrosion because such corrosion will occur intensely in one particular location and may cause perforations in the system structure carrying an industrial water stream. Obviously, these perforations may cause leaks which require shutdown of the entire industrial system so that repair can be made. Indeed, corrosion problems usually result in immense maintenance costs, as well as costs incurred as a result of equipment failure. Therefore, the inhibition of metal corrosion in industrial water is critical.

Corrosion protection of ferrous metals in industrial water systems is often achieved by adding a corrosion inhibitor. Many corrosion inhibitors, including $CrO_4^{2-}$, $MoO_4^{2-}$, $Zn^{2+}$, nitrite, orthophosphate, and polyphosphate have been used previously alone or in combination in various chemical treatment formulations. However, these inorganic chemicals are either toxic and detrimental to the environment or are not very effective against localized corrosion, especially at the economically feasible and/or environmentally acceptable low dosage levels, although they can usually provide satisfactory protection against general corrosion (e.g., corrosion rate $\leq 3$ mpy). Some organic phosphonates, such as 2-phosphono-butane-1,2,4-tricarboxylic acid (PBTC), 1-hydroxyethylidene-1,1-diphosphonic acid (HEDP) and aminotrimethylenephosphonic acid (AMP) have been used previously as corrosion inhibitors alone or in combination with other corrosion inhibitors in various chemical treatment formulations. But the effectiveness of these phosphonate based treatments is generally significantly lower than the treatments based on inorganic inhibitors.

U.S. Pat. No. 5,167,866 discloses that certain phosphonomethyl amine oxides can be used as scale and corrosion inhibitors in aqueous systems. In subsequent publications [D. Hartwick, J. Chalut and V. Jovancicevic, Corrosion/93, paper no. 266, NACE, (1993); D. Hartwick, J. Richardson, V. Jovancicevic and M. Peters, Corrosion/94, paper no. 517, NACE, (1994)], Ethanolamine bisphosphonomethyl N-oxide (EBO) was further identified to be a particularly effective pitting inhibitor. Nevertheless, the concentrations needed to obtain sufficient inhibition appear to be still too high (e.g., >50 mg/l EBO is needed to obtain an anodic inhibition efficiency of greater than 40%).

Scale build-up is another serious problem in industrial water systems. The build-up of deposit (scales) interferes with heat transfer, e.g., from the inside surface of a heat exchanger tube to the cooling medium such as water. The reduction of the rate of heat transfer occurs because the scales formed generally have a lower heat transfer coefficient than the metal tube itself. Thus, scaling reduces the efficiency of the system. Further, scaling and deposits can lead to corrosion underneath the deposits on the metallic surface and reduce the useful life of the equipment. Calcium carbonate, iron oxides and hydroxides generated in the corrosion process are some of the most commonly observed scale formers in industrial water systems.

The utilization of water which contains certain inorganic impurities, and the production and processing of crude oil water mixtures containing such impurities, is plagued by the precipitation of these impurities with subsequent scale formation. In the case of water which contains these contaminants the harmful effects of scale formation are generally confined to the reduction of the capacity or bore of receptacles and conduits employed to store and convey the contaminated water. In the case of conduits, the impedance of flow is an obvious consequence. However, a number of equally consequential problems are realized in specific utilizations of contaminated water. For example, scale formed upon the surfaces of storage vessels and conveying lines for process water may break loose and these large masses of deposit are entrained in and conveyed by the process water to damage and clog equipment through which the water is passed, e.g., tubes, valves, filters and screens. In addition, these crystalline deposits may appear in, and detract from, the final product which is derived from the process, e.g., paper formed from an aqueous suspension of pulp. Furthermore, when the contaminated water is involved in a heat exchange process, as either the "hot" or "cold" medium, scale will be formed upon the heat exchange surfaces which are contacted by the water. Such scale formation forms an insulating or thermal pacifying barrier which impairs heat transfer efficiency as well as impeding flow through the system.

While calcium sulfate and calcium carbonate are primary contributors to scale formation, other salts of alkaline-earth metals and the aluminum silicates are also offenders, e.g., magnesium carbonate, barium sulfate, the aluminum silicates provided by silts of the bentonitic, illitic, kaolinitic, etc., types.

Many other industrial waters, while not being scale forming, tend to be corrosive. Such waters, when in contact with a variety of metal surfaces such as ferrous metals, aluminum, copper and its alloys, tend to corrode one or more of such metals or alloys. A variety of compounds have been suggested to alleviate these problems. Such materials include low molecular weight polyacrylic acid polymers.

Numerous compounds have been added to these industrial waters in an attempt to prevent or reduce scale and corrosion. One such class of materials are the well known organophosphonates which are illustrated by the compounds hydroxyethylidene diphosphonic acid (HEDP) and phosphonobutane tricarboxylic acid (PBTC). Another group of active scale and corrosion inhibitors are the monosodium phosphinico(bis) succinic acids which are described in U.S. Pat. No. 4,088,678.

Most industrial waters contain alkaline earth metal cations, such as calcium, barium, magnesium, etc. and several anions such as bicarbonate, carbonate, sulfate, oxalate, phosphate, silicate, fluoride, etc. When combinations of these anions and cations are present in concentrations which exceed the solubility of their reaction products, precipitates form until these product solubility concentrations are no longer exceeded. For example, when the concentrations of calcium ion and carbonate ion exceed the solubility of the calcium carbonate reaction products, a solid phase of calcium carbonate will form. Calcium carbonate is the most common form of scale.

Solubility product concentrations are exceeded for various reasons, such as partial evaporation of the water phase, change in pH, pressure or temperature, and the introduction of additional ions which form insoluble compounds with the ions already present in the solution.

As these reaction products precipitate on surfaces of the water carrying system, they form scale or deposits. This accumulation prevents effective heat transfer, interferes with fluid flow, facilitates corrosive processes and harbors bacteria. This scale is an expensive problem in many industrial water systems causing delays and shutdowns for cleaning and removal.

Scale deposits are generated and extended principally by means of crystal growth; and various approaches to reducing scale development have accordingly included inhibition of crystal growth, modification of crystal growth and dispersion of the scale-forming minerals.

Many organophosphorus compounds have been disclosed as scale inhibitors. For example, N,N-bis(phosphonomethyl)-2-amino-1-propanol and derivatives are disclosed in U.S. Pat. No. 5,259,974; N-substituted aminoalkane-1,1-diphosphonic acids are disclosed in U.S. Pat. No. 3,957,160; and propane 1,3 disphosphonic acids are disclosed in U.S. Pat. No. 4,246,103. Further, N-bis(phosphonomethyl)amino acids for the prevention of calcium carbonate scale are disclosed in U.S. Pat. Nos. 5,414,112 and 5,478,476. 1,1 diphosphonic acid compounds are disclosed in U.S. Pat. Nos. 3,617,576 and 4,892,679.

Apparently, there is a need for a corrosion inhibitor that can effectively prevent both general corrosion and localized (e.g., pitting) corrosion of ferrous metals and can also efficiently prevent scale formation on metallic surfaces in contact with the waters of various systems, such as industrial process waters.

The objective of this invention is to provide a family of imino alkylenephosphonic acids that can effectively provide inhibition of localized (pitting) corrosion of ferrous metals in contact with such systems.

Another objective of this invention is to provide a family of imino alkylenephosphonic acids that can efficiently reduce general corrosion of ferrous metals in contact with such systems.

Still another objective of this invention is to provide a family of imino alkylenephosphonic acids that can efficiently prevent scale formation on metallic surfaces in contact with such systems.

Still another objective of this invention is to provide a family of imino alkylenephosphonic acids that can simultaneously prevent localized corrosion, general corrosion of ferrous metals, and scale formation on metallic surfaces in such systems.

SUMMARY OF THE INVENTION

This invention relates to the use of iminoalkylenephosphonic acids to prevent corrosion, including both localized corrosion and general corrosion on iron based metal surfaces in contact with a corrosive system water in an aqueous system. The invention also relates to the use of the iminoalkylenephosphonic acids to control formation, deposition and adherence of scale at the surfaces of metals in contact with a scale-forming system water in an aqueous system.

DESCRIPTION OF THE INVENTION

This invention provides a composition that can be used to prevent both localized corrosion and general corrosion of steel materials, and that can also be used to prevent formation of scales on metallic surfaces in contact with industrial water systems. The corrosion and scale inhibiting composition has the general formula (I)

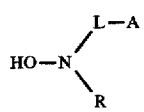

wherein L represents a substituted or unsubstituted alkylene group; A represents a phosphono group; and R represents a hydrogen atom, a substituted or unsubstituted alkyl group, aryl group or may combine with L to form a ring.

The compound represented by formula (I) is described in detail below.

In formula (I), L preferably represents a straight chain, or branched chain alkylene group having from 1 to 10 carbon atoms, more preferably from 1 to 6 carbon atoms, which may be substituted. Preferred examples of the alkylene group represented by L include methylene, ethylene, and propylene. Useful substituents for L include carboxyl groups, sulfoxy groups, phosphono groups, phosphinic acid groups and hydroxy groups.

In formula (I), A represents a phosphono group. Preferred examples of L-A include phosphonomethyl, phosphonethyl, phosphonopropyl, phosphonobutyl, phosphonophenylmethyl, and phosphonocarboxymethyl groups. Phosphonomethyl and phosphonoethyl groups are particularly preferred.

In formula (I), R preferably represents a hydrogen atom, a straight chain or branched chain alkyl group having 1 to 10 carbon atoms. More preferred are alkyl groups having from 1 to 5 carbon atoms, which may be substituted. Among the useful substituents are carboxy groups, sulfoxy groups, phosphono groups, phosphinic groups and hydroxy groups. The group R may have two or more substituents. Preferred examples of R include hydrogen, carboxymethyl, carboxyethyl, carboxypropyl, sulfomethyl, sulfoethyl, sulfopropyl, sulfobutyl, phosphonomethyl, phosphonoethyl, phosphonopropyl, and phosphonobutyl groups.

In formula (I), A or the substituents for R may be a salt of alkali metals, alkaline earth metals, ammonium or aluminum. L and R may be linked as a ring.

Compounds useful for the practice of this invention include the following: HONH(CH$_2$PO$_3$M$_2$); HON(CH$_2$PO$_3$M$_2$)$_2$; HONH(CH(CH$_3$)PO$_3$M$_2$); HON(CH(CH$_3$)PO$_3$M$_2$)$_2$; HONH(CH$_2$CH$_2$PO$_3$M$_2$); HON(CH$_2$CH$_2$PO$_3$M$_2$)$_2$; HONH(CH(CH$_2$CH$_3$)PO$_3$M$_2$); HON(CH(CH$_2$CH$_3$)PO$_3$M$_2$)$_2$; HONH(CH(CH$_2$CH$_2$CH$_3$)PO$_3$M$_2$); HON(CH(CH$_2$CH$_2$CH$_3$)PO$_3$M$_2$)$_2$; HONH(CH $(CO_2M)PO_3M_2$; $HON(CH(CO_2M)PO_3M_2)_2$; $HON(CH_2PO_3M_2)CH_2CO_2M$; $HON(CH_2PO_3M_2)CH_2CH_2CO_2M$; $HON(CH_2CH(CH_3)CO_2M)CH_2PO_3M_2$; $HON(CH_2PO_3M_2)CH_2CH_2SO_3M$; $HON(CH_2PO_3M_2)CH_2CH(OH)CH_2PO_3M_2$; $HON(CH_2CH_2N^{\oplus}X^{\ominus}(CH_3)_3)CH_2PO_3M_2$ where ($X^{\ominus}$=Cl, $Br^{\ominus}$, $I^{\ominus}$, $HSO_4^{\ominus}$); $HON(CH_2PO_3M_2)CH_2CH(OH)CH_2N^{\oplus}(CH_3)_3X^{\ominus}$ where ($X^{\ominus}$=Cl, $Br^{\ominus}$, $I^{\ominus}$, $HSO_4^{\ominus}$); $HON(CH_2CH(PO_3M_2)_2)_2$; $HONHCH_2CH(PO_3M_2)_2$; $HON(CH_3)CH_2CH_2PO_3M_2$; $HON(CH_2CH_3)CH_2CH_2PO_3M_2$; $HON(CH_3CH_2PO_3M_2)$; $HON(CH_2CH_3)CH_2PO_3M_2$;

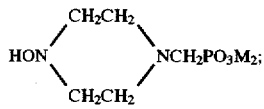

$HONH(OHC(\varnothing)PO_3M_2)$; $HONH(\varnothing\text{-}PO_3M_2)CHPO_3M_2)$; and $HON(HC(\varnothing\text{-}PO_3M_2)PO_3M_2)_2$. $\varnothing$ signifies a phenyl group.

Compounds represented by the general formula (I) have been disclosed as a composition for color development in EP 0439142 A1. Here they are unexpectedly discovered to be efficient localized corrosion inhibitors and general corrosion inhibitors of steel materials, and efficient scale inhibitors.

The compounds represented by the formula (I) can be synthesized by alkylation, nucleophilic displacement reaction, addition reactions or Mannich reactions with commercially available hydroxylamine acid salts. Particularly, the compounds represented by the formula (I) can by synthesized according to the methods as described in West German Patent 1,159,634. *Inorganic Chimica*, Vol. 93, (1986) 101.

Compounds represented by general formula (I) are particularly advantageous for the control of the deposition of calcium carbonate scale in cooling water systems. The threshhold effect is exhibited whereby the formation of scale-forming salt crystals and adherence to heat transfer surfaces is exhibited at low treatment levels.

The compounds represented by the formula (I) in amounts from 0.1 to 500 ppm can be used alone to prevent localized corrosion, general corrosion on ferrous materials which come into contact with industrial water and scale. Preferably, from 0.2 to 100 ppm may be utilized. Most preferably, from 0.2 to 20 ppm may be utilized.

Moreover, the compounds represented by the formula (I) in amounts ranging from 0.1 to 500 ppm can also be used in combination with other ferrous metal corrosion inhibitors, yellow metal corrosion inhibitors, scale inhibitors, dispersants, biocides, and additives. Such a combination may exert a synergistic effect in terms of corrosion inhibitors, scale inhibition, dispersancy and bacterium control.

Examples of the other corrosion inhibitors that can be used in combination with the compounds represented by the formula (I) are phosphorus containing inorganic chemicals, such as orthophosphates, pyrophosphates, polyphosphates; hydroxycarboxylic acids and their salts, such as gluconic acids; glucaric acid; $Zn^{2+}$; $Ce^{2+}$; $MoO_6^{2-}$; $WO_4^{2-}$; nitrites; and N,N-bis(methylene phosphonic acid)s such as EBO, HEDP and PBTC.

Examples of the yellow metal corrosion inhibitors that can be used in combination with the compounds represented by the formula (I) include benzotriazole, tolytriazole, mercaptobenzothiazole and other azole compounds. Examples of the other scale inhibitors that can be used in combination with the compounds (I) include polyacrylates, polymethylacrylates, copolymers of acrylic acid and methacrylate, copolymers of acrylic acid and acrylamide, polymaleic acid, copolymers of acrylic acid and maleic acid, polyesters, polyaspartic acid, funtionalized polyaspartic acid, terpolymers of acrylic acid, and acrylamide/sulfomethylated acrylamide copolymers, HEDP (1-hydroxyethylidene-1,1-diphosphonic acid), PBTC (2-phosphono-butane-1,2,4-tricarboxylic acid), AMP (amino tri(methylene phosphonic acid), N,N-bis(methylene phosphonic acid)s and mixtures thereof.

Examples of biocides that can be used in combination with the compounds (I) include oxidizing biocides e.g. $Cl_2$, NaOCl, $Br_2$, NaOBr, or nonoxidizing biocides such as glutaraldehyde, isothiozolines(5-chloro-2-methyl-4-isothiazoline -5-one and 2-methyl-4-isothioazoline 3-one), sulfamic acid-stabilized bleach and sulfamic acid stabilized bromine.

To treat a cooling water system, the compounds may be added to the cooling tower basin or at any other location wherein good mixing can be achieved in a short time. If oxidizing biocides are to be added in conjunction with the hydroxyimino alkylene phosphonic acids, addition points for these two components should be well separated to avoid chemical interactions. In all other cases, order of addition is inconsequential.

The invention is a method for preventing scale formation on metal surfaces in contact with scale-forming industrial water within an industrial system which comprises the step of treating said water with an effective scale-inhibiting amount of a water-soluble phosphonic acid of formula (I)

(I)

wherein R is selected from the group consisting of hydrogen, $C_1$–$C_{10}$ alkyl, hydroxy, carboxy, sulphoxy, phosphono and phosphinic groups; L is selected from the group consisting of $C_1$–$C_{10}$ alkyl groups; and A is selected from the group consisting of phosphonomethyl, phosphonoethyl, phosphonopropyl, phosphonobutyl, phosphonophenylmethyl and phosphonocarboxymethyl groups. The industrial system may be a cooling water tower and the industrial water may be cooling water.

The term system as utilized herein is defined as any industrial process which utilizes water. The system could contain primarily aqueous fluids, or primarily aqueous fluids which also include water. Such systems are found as industrial processes which utilize boilers or cooling water towers. For example, the food processing industry is an industry which requires such a system.

The invention is a method for preventing scale formation on metal surfaces in contact with scale-forming industrial process water which comprises treating said water with an effective scale-inhibiting amount of a water-soluble phosphonic acid of formula (II)

(II)

wherein $R^1$ is selected from the group consisting of hydrogen, carboxyl, $C_1$–$C_{30}$ alkyl groups; $R^2$ is selected from the group consisting of hydrogen, $C_1$–$C_{10}$ alkyl, aryl, alkyl carboxy, alkyl sulfoxy, alkoxy, alkylamino and carboxyl groups; and M is selected from the group consisting of alkaline metal ions, alkaline earth metal ions, ammonium salts, zinc salts and aluminum salts.

The industrial process water may be cooling water. The scale may be calcium carbonate. Moreover, the scale may be derived from various system waters containing calcium sulfate, calcium phosphate, calcium silicate, magnesium carbonate, magnesium silicate, magnesium phosphate, barium carbonate, barium sulfate, barium silicate, barium phosphate and iron oxide. Also, the cooling water may contain a biocide.

The invention is also a method for preventing scale formation on metal surfaces in contact with scale-forming industrial process water which comprises treating said water with an effective scale-inhibiting amount of a water-soluble phosphonic acid of formula (III)

wherein $R^1$ is selected from the group consisting of hydrogen, $C_1$–$C_{30}$ alkyl, and aryl groups; $R^2$ is selected from the group consisting of hydrogen, $C_1$–$C_{10}$ alkyl, aryl and carboxyl groups; and M is selected from the group consisting of alkaline metal ions, alkaline earth metal ions, ammonium salts, zinc salts and aluminum salts.

The industrial process water may be cooling water. The scale may be calcium carbonate. Additionally, the cooling water may contain a biocide.

The invention is also a method for preventing scale formation on metal surfaces in contact with scale-forming industrial process water which comprises treating said water with an effective scale-inhibiting amount of a water-soluble phosphonic acid of formula (IV)

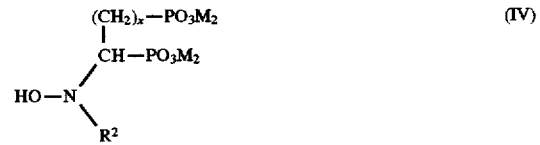

wherein $R^2$ is selected from the group consisting of hydrogen, $C_1$–$C_{10}$ alkyl, aryl and carboxyl groups; x is an integer from 1 to 10, and M is selected from the group consisting of alkaline metal ions, alkaline earth metal ions, ammonium salts, zinc salts and aluminum salts.

The industrial process water may be cooling water. The scale may be calcium carbonate. Additionally, the cooling water may contain a biocide.

The invention is also a method for preventing scale formation on metal surfaces in contact with scale-forming industrial process water which comprises treating said water with an effective scale-inhibiting amount of a water-soluble phosphonic acid of formula (V)

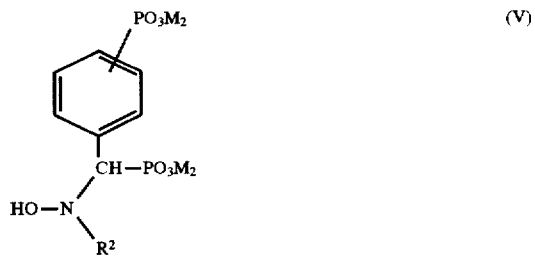

wherein $R^2$ is selected from the group consisting of hydrogen, $C_1$–$C_{10}$ alkyl, aryl and carboxyl groups; and M is selected from the group consisting of alkaline metal ion's, alkaline earth metal ions, ammonium salts, zinc salts and aluminum salts.

The industrial process water may be cooling water. The scale may be calcium carbonate. Additionally, the cooling water may contain a biocide.

The invention is also a method for preventing scale formation on metal surfaces in contact with scale-forming industrial process water which comprises treating said water with an effective scale-inhibiting amount of a water-soluble phosphonic acid of formula (VI)

wherein x is from 1 to 10 and M is selected from the group consisting of alkaline metal ions, alkaline earth metal ions, ammonium salts, zinc salts and aluminum salts.

The industrial process water may be cooling water. The phosphonic acid may be N-hydroxyl-N,N-bis(methylene phosphonic acid) amine. The scale may be calcium carbonate. Additionally, the cooling water may contain a biocide.

The invention is a method for preventing corrosion on metal surfaces in contact with corrosive industrial water within an industrial system which comprises the step of treating said water with an effective corrosion inhibiting amount of a water-soluble phosphonic acid of formula (I)

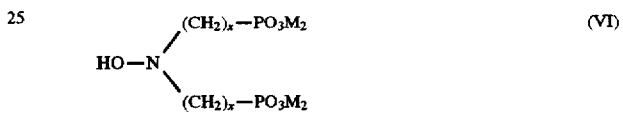

wherein R is selected from the group consisting of hydrogen, $C_1$–$C_{10}$ alkyl, hydroxy, carboxy, sulphoxy, phosphono and phosphinic groups; L is selected from the group consisting of $C_1$–$C_{10}$ alkyl groups; and A is selected from the group consisting of phosphonomethyl, phosphonoethyl, phosphonopropyl, phosphonobutyl, phosphonophenylmethyl and phosphonocarboxymethyl groups.

Furthermore, the invention is also a method for preventing corrosion on metal surfaces in contact with corrosive industrial process water which comprises treating said water with an effective corrosion inhibiting amount of a water-soluble phosphonic acid of formula (II)

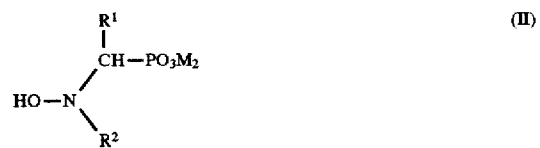

wherein $R^1$ is selected from the group consisting of hydrogen, and $C_1$–$C_{30}$ alkyl groups; $R^2$ is selected from the group consisting of hydrogen, $C_1-C_{10}$ alkyl, aryl and carboxyl groups; and M is selected from the group consisting of alkaline metal ions, alkaline earth metal ions, ammonium salts, zinc salts and aluminum salts.

The industrial process water may be cooling water.

The invention is also a method for preventing corrosion on metal surfaces in contact with corrosion industrial process water which comprises treating said water with an effective corrosion inhibiting amount of a water-soluble phosphonic acid of formula (III)

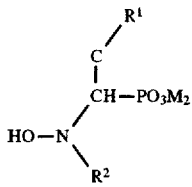

wherein $R^1$ is selected from the group consisting of hydrogen, $C_1-C_{30}$ alkyl, and aryl groups; $R^2$ is selected from the group consisting of hydrogen, $C_1-C_{10}$ alkyl, aryl and carboxyl groups; and M is selected from the group consisting of alkaline metal ions, alkaline earth metal ions, ammonium salts, zinc salts and aluminum salts.

The industrial process water may be cooling water.

The invention is also a method for preventing corrosion on metal surfaces in contact with corrosive industrial process water which comprises treating said water with an effective corrosion inhibiting amount of a water-soluble phosphonic acid of formula (IV)

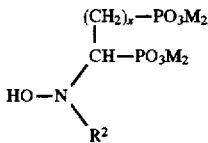

wherein $R^2$ is selected from the group consisting of hydrogen, $C_{1-10}$ alkyl, aryl and carboxyl groups; x is an integer from 1 to 10, and M is selected from the group consisting of alkaline metal ions, alkaline earth metal ions, ammonium salts, zinc salts and aluminum salts.

The industrial process water may be cooling water.

The invention is also a method for preventing corrosion on metal surfaces in contact with corrosive industrial process water which comprises treating said water with an effective corrosion inhibiting amount of a water-soluble phosphonic acid of formula (V)

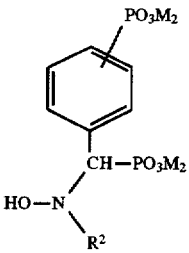

wherein $R^2$ is selected from the group consisting of hydrogen, $C_1-C_{10}$ alkyl, aryl and carboxyl groups; and M is selected from the group consisting of alkaline metal ions, alkaline earth metal ions, ammonium salts, zinc salts and aluminum salts.

The industrial process water may be cooling water.

The invention is also a method for preventing corrosion on metal surfaces in contact with corrosive industrial process water which comprises treating said water with an effective corrosion inhibiting amount of a water-soluble phosphonic acid of formula (VI)

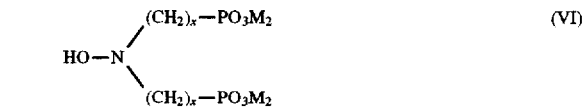

wherein x is from 1–10 and M is selected from the group consisting of alkaline metal ions, alkaline earth metal ions, ammonium salts, zinc salts and aluminum salts.

The industrial process water may be cooling water.

The phosphonic acid may be N-hydroxy-N,N-bis (methylene phosphonic acid) amine.

The following examples are presented to describe preferred embodiments and utilities of the invention and are not meant to limit the invention unless otherwise stated in the claims appended hereto.

EXAMPLE 1

To a four-necked flask equipped with a mechanical stirrer, a condenser, a thermometer and an addition funnel was added phosphorus acid (80.0 g, 1.0 mol, concentrated hydrochloric acid (113.4 g), hydroxylamine hydrochloric acid (34.8 g, 0.50 mol) and deionized water (100.0 g). The mixture was heated to 85° C. under a flow of nitrogen gas. 30% formaldehyde aqueous solution (162.1, 2.0 mol) was added dropwise over 45 minutes to 1.0 hour. The solution was heated with stirring at 80° to 90° C. for an additional 2.5 hours to form a solution of N-hydroxyl-N,N-bis (methylenephosphonic acid)amine [HON(Ch$_2$PO$_3$H$_2$)$_2$]. The formation of the compound was confirmed by $^{13}C$ and $^{31}P$ NMR spectroscopic analysis.

EXAMPLE 2

An experimental setup was used to determine the maximum penetration (or pitting) rate of an Fe foil. The working electrode (WE) was a 99.5% pure 25μ thick Fe foil (Goodfellow Ltd.). The surface area exposed to solution was 0.636 cm$^2$. The working electrode foil was mounted on a Nylon holder. A stainless steel screw presser was used to fasten the foil to the holder. A thin (e.g., ~0.15 mm thickness), flat Viton O-ring was used to separate the stainless steel presser and the working electrode foil. The stainless steel presser was also served as the auxiliary electrode. It was then connected electrically to a 5.6 KOhm resister and then a 1.5V battery, and finally the zero resistance ammeter. A high density graphite rod was used as the counter electrode (CE). A saturated calomel electrode was used as the reference electrode (RE). The working electrode, its holder, the reference electrode and the counter electrode were immersed in the test solution during the experiment. The test solution contains 120 mg/L CaCl$_2$, 68 mg/L MgSO$_4$, 150 mg/L NaHCO$_3$, and 105 mg/L NaCl. The temperature under test conditions was 23°–24° C. During the experiment, the pH was maintained at 8.4±0.2 by addition of 0.01M H$_2$SO$_4$ when required. A zero resistance ammeter (ZRA) was used to measure current between the auxiliary electrode and the counter electrode and the corrosion potential of the system. The auxiliary electrode was normally insulated from the solution by the Nylon holder and a section of heat-shrinkable Teflon tubing. Before penetration of the metal foil due to corrosion attack, the corrosion potential is determined by the counter electrode. The ZRA current is zero (or a very low background value) because the electrical circuit between the counter electrode and the auxiliary electrode is not completed. Once penetration of the metal foil (i.e., working electrode) occurs, the electrolyte (i.e., the test solution) will leak in the test set-up and lead to the completion of electrical connection between the counter electrode (graphite) and the auxiliary electrode (the stainless steel pressure). As soon as this occurs, the ZRA will detect a current flow and a new corrosion potential. Since the ZRA current and corrosion potential were recorded regularly (no longer than 1 record/10 min.) by the computer connected to the ZRA via an analog-to-digital converter and a digital acquisition card, one can easily obtain the time between immersion and perforation from the computer data record. Using the time between immersion and perforation t, and the metal foil thickness d, one can calculate the maximum pitting rate or maximum penetration rate according to the following equation:

Maximum Penetration Rate $(mpy)=344.9\ (d/t)$ where the unit for d is μm and for t is hours. Mpy denotes milliinch per year.

The use of the battery was to provide a strong electric field to drive the electrolyte to migrate inside the Nylon holder once leakage occurs and to generate a sufficiently high detectable current to improve the detection accuracy. Separate experiments showed that a leakage can be detected in less than a few minutes using the set-up described here. The use of the 5.6 Kohm resister was to reduce the magnitude of the current which could pass through the ZRA.

All solutions were prepared using Analytical grade chemicals or commercially available products. The tests were conducted under aerated conditions at room temperature. The solution pH was controlled by adding 0.01M $H_2SO_4$ via an automatic pH controller. The pH variation was within ±0.2 of the target value. The solution volume change was no greater than 5% during the tests. Magnetic stirring was also used in the tests. The Fe foil was washed with acetone before immersion.

The above described test procedure was utilized to obtain the results of Table I. Since a lower maximum penetration rate is desirable, it is evident that the phosphonic acid of this invention performs more efficiently than the currently utilized HEDP, PBTC, EBO, $Na_2MoO_4$, and orthophosphate.

Since a lower maximum penetration rate is desirable, these results show that hydroxylimino bis(methyl phosphonic acid) is the most effective pitting corrosion inhibitor among the compounds tested. It is more effective than some of well known inhibitors, such as $MoO_4$, orthophosphate, HEDP, PBTC and EBO under the test conditions. It is also effective in reducing the maximum pitting rate (or penetration rate) even in a nearly stagnant (or low flow rate) solution where pitting or localized corrosion rate tends to be substantially greater than the one in the same solution but with a higher flow rate because a higher degree of inhomogeneities (i.e., pH, and concentration gradients) on the solution side can be developed more easily under such conditions. Another attractive feature of hydroxylimino bis (methyl phosphonic acid) (or HIB) is that it is effective in reducing maximum pitting rate even at low dosage levels (e.g., 5 mg/l), while under the same dosage condition, a well known localized corrosion inhibitor $MoO_4^{2-}$ was found to be an accelerator of pitting corrosion (see Table I). The results are summarized by the calculated inhibition efficiency values, which demonstrate that HIB alone is more efficient than other conventional treatments, and that HIB in combination with a polymer is as effective as other conventional treatments in combination with polymers. These results indicate that unlike other well known anodic inhibitors, such as molybdate which will accelerate pitting corrosion at insufficient dosage levels (or being the so-called "dangerous" corrosion inhibitor), HIB is inherently safe, even at low dosage levels.

TABLE I

Maximum Penetration Rate of Fe in a Synthetic Plant Water

| Treatment | Solution | Maximum Penetration Rate (mpy) | Mean mpy | I.E.[1] |
|---|---|---|---|---|
| Blank | stagnant | 952.7 | | |
| " | stagnant | 214.5 | | |
| " | stagnant | 303.8 | 490 | |
| poly(acrylamide/acrylic acid)[2] | stagnant | 289.0 | | |
| poly(acrylamide/acrylic acid)[2] | stagnant | 648.0 | 469 | 4.3% |
| poly(acrylamide/acrylic acid)[2] + EBO[3] | stagnant | 91 | 91 | 81% |
| poly(acrylamide/acrylic acid)[2] + HIB[4] | stagnant | 90.0 | | |
| poly(acrylamide/acrylic acid)[2] + HIB[4] | stagnant | 83 | 86 | 82% |
| Blank | stirred | 104 | 104 | |
| poly(acrylamide/acrylic acid)[2] | stirred | 99 | 99 | 4.8% |
| EBO[3] | stirred | 96 | 96 | 7.7% |
| HIB[4] | stirred | 50 | 50 | 51.9% |
| Compound 1[5] | stirred | 165 | 165 | −58.7% |
| HEDP[6] | stirred | 126 | 126 | −21.1% |
| PBTC[7] | stirred | 180 | 180 | −73.1% |
| poly(acrylamide/acrylic acid)[2] + Compound 2[8] | stirred | 83 | 83 | 20.2% |

[1] inhibition efficiency, calculated as $(Mean_{blank} - Mean_{treatment})/Mean_{blank}$
[2] 3:1 mole ratio of acrylamide to acrylic acid copolymer, 10,000 ~ 12,500 MW, 1 mg/l added
[3] hydroxyethyl bis (phosphonomethyl) amine N-oxide, 5 mg/l added
[4] hydroxylimino bis (methyl phosphonic acid), 5 mg/l added
[5] $Na_2MoO_4$, 5 mg/l as $MoO_4^{2-}$ added
[6] 1-hydroxyethylidene-1,1-diphosphonic acid, 5 mg/l added
[7] 2-phosphono-butane-1,2,4-tricarboxylic acid, 5 mg/l added
[8] orthophosphate, 5 mg/l added The compounds represented by the formula (I) provide better localized corrosion inhibition than inorganic corrosion inhibitors such as $MoO_4^{2-}$ and $PO_4^{3-}$ and organic corrosion inhibitors such as HEDP, PBTC, and even EBO at an equal dosage as shown in Table I.

EXAMPLE 3

A pre-polished carbon steel (C1010) cylindrical tube (length=0.5 inches, outer diameter=0.5 inches, area=5 cm²) sealed with MICROSTOP STOP-OFF™ lacquer (available from Pyramid Plastic Inc.) and installed on a Pine rotator was used as the working electrode. The electrode was polished with a 600 grit SiC sand paper, washed with acetone and deionized water, and dried with KIMWIPES™ before applying the lacquer. Then the electrode was placed in the air for ~15 minutes to allow the paint to dry before immersion. The counter electrode was two high density graphite rods. A saturated calomel electrode was used as the reference electrode. Solution Ohmic drop was minimized by placing the small Luggin capillary opening about 1~2 mm from the working electrode surface. A.C. impedance experiments show that the ohmic drop in the low corrosion rate conditions (e.g., Rp>3000 ohm cm² or <7~9 mpy) usually contributed to not greater than 10% of the total measured polarization resistance (Rp).

A Greene Cell (available from EG&G Princeton Applied Research) holding 700 ml solution was used in the tests. The test solutions were prepared from deionized water, analytical grade chemicals and chemicals synthesized according to the method described in this invention. The solution was aerated and allowed to come to thermal and chemical steady-state (typically ~0.5 hours) before immersing the working electrode. All the openings of the cell were covered with either a rubber plug or SARAN WRAP™ to minimize solution loss due to evaporation. The loss due to evaporation was usually less than 10% in 24 hours. All the bench-top tests were conducted at 38°±0.3° C.

An EG&G Princeton Applied Research Model 273 potentiostat and a Dell 386SX computer operating under the control of EG&G software packages (M352 and Headstart), were used to conduct the electrochemical measurements. After 20–24 hours immersion, the polarization resistance of the electrode was determined by imposing a small overpotential (±15 mV versus $E_{corr}$) on the working electrode and measuring the resulting current under steady state conditions. Quasi-steady-state potentiodynamic cathodic and anodic scans (e.g., 0.2 mV/sec) were conducted immediately after the polarization resistance measurement. These measurements were commenced at the corrosion potential and polarized up to 200 mV in either cathodic or anodic direction. The cathodic branch was recorded first. The anodic scan was conducted ~0.5 hours after the completion of the cathodic scan. The corrosion rates were determined from extrapolation of either the anodic branch or cathodic branch of the linear log(i) versus potential region of the polarization curve to the corrosion potential or were determined from the polarization resistance with the use of the Stem-Geary equation. The Tafel slopes determined from the quasi-steady-state potentiodynamic scans were used to calculate the corrosion rates from the measured polarization resistances. The corrosion rates shown in Table II were calculated as the average of polarization resistance rate, anodic Tafel and cathodic Tafel extrapolation rates.

TABLE II

Test Results for Evaluation of Inhibition of General Corrosion in a Synthetic Plant Water[5]

|  | Immersion Time (hrs) | Corrosion Rates (mpy) Mean % | I.E.[1] |
|---|---|---|---|
| Blank | 20–24 | 23.8 | 0 |
| poly(acrylamide/acrylic acid)[2] | 20–24 | 32.6 | -37.0 |
| 10 ppm EBO[3] | 20–24 | 13.5 | 43.3 |
| 10 ppm EBO[3] + poly(acrylamide/acrylic acid)[2] | 20–24 | 8.69 | 63.5 |
| 20 ppm EBO[3] + poly(acrylamide/acrylic acid)[2] | 20–24 | 6.12 | 74.3 |
| 40 ppm EBO[3] + poly(acrylamide/acrylic acid)[2] | 20–24 | 0.99 | 95.8 |
| 20 ppm EBOA[3] + poly(acrylamide/acrylic acid)[2] | 46 | 37.6 | -57.8 |
| 40 ppm EBO[3] + poly(acrylamide/acrylic acid)[2] | 72 | 0.69 | 97.1 |
| 10 mg/l HIB[4] + poly(acrylamide/acrylic acid)[2] | 20–24 | 6.25 | 73.8 |
| 20 mg/l HIB[4] + poly(acrylamide/acrylic acid)[2] | 20–24 | 0.83 | 96.5 |
| 40 mg/l HIB[4] + poly(acrylamide/acrylic acid)[2] | 20–24 | 0.064 | 99.7 |
| 40 mg/l HIB[4] + poly(acrylamide/acrylic acid)[2] | 44–47 | 0.018 | 99.9 |
| 40 mg/l HIB[4] + poly(acrylamide/acrylic acid)[2] | 120–122 | 0.19 | 99.2 |
| blank | 16 | 15.7 | 0 |
| 5 mg/l poly(acrylamide/acrylic acid) | 16 | 16 | -1.91 |
| 15 mg/l poly(acrylamide/acrylic acid) | 16 | 17 | -8.28 |

TABLE II-continued

Test Results for Evaluation of Inhibition of General Corrosion in a Synthetic Plant Water[5]

|  | Immersion Time (hrs) | Corrosion Rates (mpy) Mean % | I.E.[1] |
|---|---|---|---|
| 30 mg/l poly(acrylamide/acrylic acid) | 16 | 12.3 | 21.7 |
| 55 mg/l poly(acrylamide/acrylic acid) | 16 | 10.9 | 30.6 |
| 30 mg/l HIB[4] | 16 | 2.67 | 83 |
| 25 mg/l HIB[4] + 5 mg/l poly(acrylamide/acrylic acid) | 16 | 1.56 | 90.1 |
| 30 mg/l EBO[3] | 16 | 5.54 | 64.7 |
| 25 mg/l HIB[4] + 5 mg/l poly(acrylamide/acrylic acid) | 16 | 3.76 | 76.1 |

[1]inhibition efficiency, calculated as $(Mean_{blank} - Mean_{treatment})/Mean_{blank}$
[2]3:1 mole ratio of acrylamide to acrylic acid, 10–12.5K MW, 1 mg/l added
[3]hydroxyethyl bis (phosphonomethyl) amine N-oxide
[4]hydroxylimino bis(methyl phosphonic acid)
[5]conditions of experiment are: pH = 8.4, 100° F., 160 rpm, C1010, Air The compounds represented by the formula (I) provide better general corrosion inhibition than known organic phosphonic acids such as HEDP, PBTC and even EBO at an equal dosage as shown in Table II.

EXAMPLE 4

Hydroxylimino bis(methyl phosphonic acid) or HIB can also be used with in combination with other industrial water treatments to enhance their corrosion protection performance. Using the test procedure described in Example 3, the effect of HIB on the corrosion inhibition performance of a commonly used phosphates based cooling water treatment formulation is investigated. In each trial, from 1 to 3 of the components were added together and tested. In the absence of any treatment, the corrosion rate is 15.4. Lower corrosion rates were achieved when HIB was one of the components of the solution, as the results illustrate. These conditions and results are given in Table III.

These results show the addition of HIB leads to a substantial reduction of corrosion rate in the presence of a phosphate based treatment program. The experiments were run under soft water conditions as simulated by the addition of 50 mg/l Ca at a pH of 8 and under hard water conditions as simulated by the addition of 200 mg/l Ca at a pH of 7, in the presence of a relatively high chloride concentration (400 ppm Cl⁻) to simulate corrosive conditions. All solutions also contain 50 mg/l $MgSO_4$, 200 mg/l $Na_2SO_4$, 100 mg/l $NaHCO_3$— initially (all as $CaCO_3$), and 2 ppm tolyltriazole. Solution pH was controlled by adding 0.01M $H_2SO_4$ as needed. Other experimental conditions: (1) Temperature: 120° F.; (2) Rotation rate: 160 rpm; (3) Electrode sample: C1010 carbon steel; (4) Aerated; and (5) 16 h immersion.

The use of HIB can also lead to the reduction of phosphate usage but still providing equal or better corrosion protection. The lower phosphate usage in the treatment will make the treatment more environmentally friendly.

TABLE III

Effect of HIB on Corrosion Inhibition of Mild Steel under soft/hard water conditions

| Ca + 2 (mg/l CaCO$_3$) | Component A[1] (mg/l) | HIB[2] (mg/l) | Component B[3] (mg/l) | Corrosion Rate (mpy) |
|---|---|---|---|---|
| 200 | 0   | 0  | 0  | 15.4 |
| 200 | 0   | 0  | 30 | 19.5 |
| 200 | 40  | 0  | 30 | 13.3 |
| 200 | 40  | 5  | 30 | 8.28 |
| 200 | 40  | 10 | 30 | 3.32 |
| 200 | 40  | 20 | 30 | 1.48 |
| 200 | 70  | 10 | 30 | 0.77 |
| 200 | 100 | 0  | 30 | 3.43 |
| 200 | 100 | 10 | 30 | 0.64 |
| 50  | 0   | 0  | 0  | 18.0 |
| 50  | 0   | 0  | 30 | 14.8 |
| 50  | 100 | 0  | 30 | 13.8 |
| 50  | 100 | 5  | 30 | 0.87 |
| 50  | 100 | 20 | 30 | 1.23 |

[1]a mixture of 12.15 wt % H$_3$PO$_4$, 10.8 wt % K$_4$P$_2$O$_7$, 0.005 wt % Hexapotassium hexamethylene diamine tetra kis (methylene phosphonate), and 3.5 wt % sodium tolyltriazole.
[2]Hydroxylimino bis (methyl phosphonic acid)
[3]13.34 wt % acrylic acid (50–60%)/acrylamide (20–36%)/amino methane sulfonate (14–20%) terpolymer

EXAMPLE 5

The formation of calcium carbonate crystals from a saturated solution of calcium and carbonate ions is an endothermic process, therefore the process has a greater driving force at higher temperatures and that CaCO$_3$ depositions are most easily formed at elevated temperatures. In this test, the tendency of an inhibitor to the formation of CaCO$_3$ precipitate at a temperature of interest is studied. Such a precipitate has been viewed as forming by the adherence of very small particles to each other or to surfaces. Scale inhibitors seek to limit the agglomeration and adherence of these small particles, and thus reduce the amount of CaCO$_3$ deposit which is formed on the heat exchanger tubes of cooling water systems or other industrial water treatment systems such as boiler metal surfaces.

In a stir and settle test, calcium and bicarbonate were added to provide a chosen initial concentration. Then an inhibitor of a given concentration (listed in Table IV) was added. The temperature of the test solution was maintained at 122° F. (or 50° C.). Using dilute aqueous NaOH, the pH was slowly increased to 9.0 and maintained for two hours. At the end of 2 hours, a sample of 1.0–3.0 ml solution sample was taken and it was filtered with a 0.45 µm filter. The final soluble calcium concentration was determined by atomic absorption analysis on the resulting filtered samples (given in column 3 of Table IV). Subtraction of the soluble calcium concentration from the initial calcium concentration yielded the data given column 4 of Table IV as 2.0 hr ppt as mg/l CaCO$_3$. It can be used to represent the amount of calcium which would be expected of from CaCO$_3$ on the heat exchange surfaces. The remaining unfiltered solution was then set aside and allowed to stand for 24 hours at room temperature (~22° C.). During this time, the calcium carbonate particles "settle" to the bottom and a portion of the solution is taken from the very top of the sample (typically 1.00–3.00 ml). Analysis of the amount of soluble calcium by atomic absorption in these samples provided the data listed in Column 5 as 24.0 hr disp. as mg/l CaCO$_3$. The results provide information about the dispersant qualities of the inhibitors.

TABLE IV

CaCO$_3$ Scale Inhibition for HIB Obtained in the Solubility Stress Tests[3]

| Solution (mg/l) Ca/NaHCO$_3$ (mg/l) | Inhibitor | 2.0 Hr Ca$^{2+}$ soluble mg/l CaCO$_3$ | 2.0 Hr precipitate mg/ Ca CO$_3$ | 24.0 Hr dispersed mg/l CaCO$_3$ |
|---|---|---|---|---|
| 500/500 | none | 5.2 | 494.8 | 11.5 |
| 500/500 | 10 mg/l PBTC[2] | 160.1 | 339.9 | 207.1 |
| 300/300 | 10 mg/l HIB[1] | 166.9 | 133.1 | 181.1 |
| 400/400 | 10 mg/l HIB[1] | 117.3 | 282.3 | 122.7 |
| 500/500 | 10 mg/l HIB[1] | 163.9 | 336.1 | 177.1 |
| 600/600 | 10 mg/l HIB[1] | 106.6 | 493.4 | 110.4 |
| 700/700 | 10 mg/l HIB[1] | 57.4 | 642.6 | 56.8 |
| 800/800 | 10 mg/l HIB[1] | 7.3 | 792.7 | 10.0 |

[1]hydroxylimino bis (methyl phosphonic acid), 5 ppm added
[2]2-phosphonobutane-1,2,4-tricarboxylic acid
[3]T = 120° F., pH = 9.0, Ca is from CaCl$_2$ The results show that the compounds represented by the formula (I) also prove effective against scale such as CaCO$_3$ scale inhibition. PBTC, which is a well known effective calcium carbonate scale inhibitor and a poor corrosion inhibitor, is compared to HIB. HIB gives comparable results to PBTC. The advantage of HIB is that it demonstrates both corrosion and scale inhibition activity at the same time.

Changes can be made in the composition, operation and arrangement of the method of the present invention described herein without departing from the concept and scope of the invention as defined in the following claims:

We claim:

1. A method for preventing scale formation on metal surfaces in contact with scale-forming industrial cooling water within an industrial cooling water tower system which comprises the step of treating said water with an effective scale-inhibiting amount of a water-soluble phosphonic acid of formula (I)

(I)

wherein R is selected from the group consisting of hydrogen, C$_1$–C$_{10}$ alkyl, hydroxy, carboxy, sulphoxy, phosphono and phosphinic groups; L is selected from the group consisting of C$_1$–C$_{10}$ alkyl groups; and A is selected from the group consisting of phosphonomethyl, phosphonoethyl, phosphonopropyl, phosphonobutyl, phosphonophenylmethyl and phosphonocarboxymethyl groups.

2. The method of claim 1 wherein the scale is calcium carbonate.

3. The method of claim 1 wherein the cooling water contains a biocide.

4. The method of claim 1 wherein the water-soluble phosphonic acid is of the formula (II)

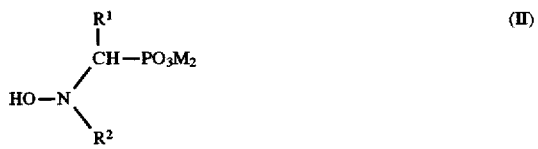

(II)

wherein R$^1$ is selected from the group consisting of hydrogen, carboxyl, C$_1$–C$_{30}$ alkyl groups; R$^2$ is selected from the group consisting of hydrogen, C$_1$–C$_{10}$ alkyl, aryl, alkyl carboxy, alkyl sulfoxy, alkoxy, alkylamino and carboxyl groups; and M is selected from the group consisting of alkaline metal ions, alkaline earth metal ions, ammonium salts, zinc salts and aluminum salts.

5. The method of claim 4 wherein the scale is calcium carbonate.

6. The method of claim 4 wherein the cooling water contains a biocide.

7. The method of claim 1 wherein the water-soluble phosphonic acid is of the formula (III)

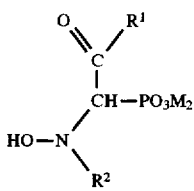
(III)

wherein $R^1$ is selected from the group consisting of hydrogen, $C_1$–$C_{30}$ alkyl, and aryl groups; $R^2$ is selected from the group consisting of hydrogen, $C_1$–$C_{10}$ alkyl, aryl and carboxyl groups; and M is selected from the group consisting of alkaline metal ions, alkaline earth metal ions, ammonium salts, zinc salts and aluminum salts.

8. The method of claim 7 wherein the scale is calcium carbonate.

9. The method of claim 7 wherein the cooling water contains a biocide.

10. The method of claim 1 wherein the water-soluble phosphonic acid is of the formula (IV)

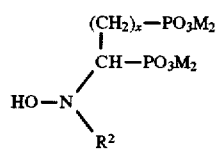
(IV)

wherein $R^2$ is selected from the group consisting of hydrogen, $C_1$–$C_{10}$ alkyl, aryl and carboxyl groups; x is an integer from 1 to 10, and M is selected from the group consisting of alkaline metal ions, alkaline earth metal ions, ammonium salts, zinc salts and aluminum salts.

11. The method of claim 10 wherein the scale is calcium carbonate.

12. The method of claim 10 wherein the cooling water contains a biocide.

13. The method of claim 1 wherein the water-soluble phosphonic acid is of the formula (V)

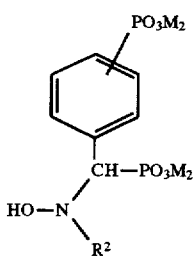
(V)

wherein $R^2$ is selected from the group consisting of hydrogen, $C_1$–$C_{10}$ alkyl, aryl and carboxyl groups; and M is selected from the group consisting of alkaline metal ions, alkaline earth metal ions, ammonium salts, zinc salts and aluminum salts.

14. The method of claim 13 wherein the scale is calcium carbonate.

15. The method of claim 13 wherein the cooling water contains a biocide.

16. The method of claim 1 wherein the water-soluble phosphonic acid is of the formula (VI)

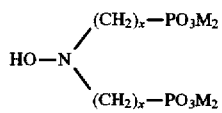
(VI)

wherein x is from 1 to 10 and M is selected from the group consisting of alkaline metal ions, alkaline earth metal ions, ammonium salts, zinc salts and aluminum salts.

17. The method of claim 16 wherein the phosphonic acid is N-hydroxyl-N,N-bis(methylene phosphonic acid) amine.

18. The method of claim 16 wherein the scale is calcium carbonate.

19. The method of claim 16 wherein the cooling water contains a biocide.

20. A method for preventing corrosion on metal surfaces in contact with corrosive industrial cooling water within an industrial cooling water tower system which comprises the step of treating said water with an effective corrosion inhibiting amount of a water-soluble phosphonic acid of formula (I)

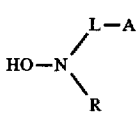
(I)

wherein R is selected from the group consisting of hydrogen, $C_1$–$C_{10}$ alkyl, hydroxy, carboxy, sulphoxy, phosphono and phosphinic groups; L is selected from the group consisting of $C_1$–$C_{10}$ alkyl groups; and A is selected from the group consisting of phosphonomethyl, phosphonoethyl, phosphonopropyl, phosphonobutyl, phosphonophenylmethyl and phosphonocarboxymethyl groups.

21. The method of claim 20 wherein the water-soluble phosphonic acid is of the formula (II)

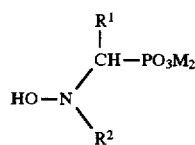
(II)

wherein $R^1$ is selected from the group consisting of hydrogen, and $C_1$–$C_{30}$ alkyl groups; $R^2$ is selected from the group consisting of hydrogen, $C_1$–$C_{10}$ alkyl, aryl and carboxyl groups; and M is selected from the group consisting of alkaline metal ions, alkaline earth metal ions, ammonium salts, zinc salts and aluminum salts.

22. The method of claim 20 wherein the water-soluble phosphonic acid is of the formula (III)

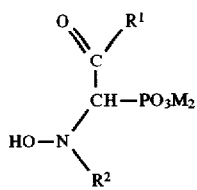

(III)

wherein $R^1$ is selected from the group consisting of hydrogen, $C_1$–$C_{30}$ alkyl, and aryl groups; $R^2$ is selected from the group consisting of hydrogen, $C_1$–$C_{10}$ alkyl, aryl and carboxyl groups; and M is selected from the group consisting of alkaline metal ions, alkaline earth metal ions, ammonium salts, zinc salts and aluminum salts.

23. The method of claim 20 wherein the water-soluble phosphonic acid is of the formula (IV)

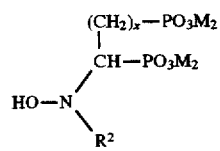

(IV)

wherein $R^2$ is selected from the group consisting of hydrogen, $C_1$–$C_{10}$ alkyl, aryl and carboxyl groups; x is an integer from 1 to 10, and M is selected from the group consisting of alkaline metal ions, alkaline earth metal ions, ammonium salts, zinc salts and aluminum salts.

24. The method of claim 20 wherein the water-soluble phosphonic acid is of the formula (V)

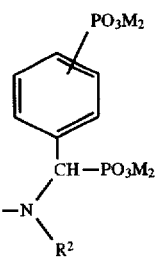

(V)

wherein $R^2$ is selected from the group consisting of hydrogen, $C_1$–$C_{10}$ alkyl, aryl and carboxyl groups; and M is selected from the group consisting of alkaline metal ions, alkaline earth metal ions, ammonium salts, zinc salts and aluminum salts.

25. The method of claim 20 wherein the water-soluble phosphonic acid is of the formula (VI)

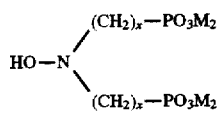

(VI)

wherein x is from 1–10 and M is selected from the group consisting of alkaline metal ions, alkaline earth metal ions, ammonium salts, zinc salts and aluminum salts.

26. The method of claim 25 wherein the phosphonic acid is N-hydroxy-N,N-bis(methylene phosphonic acid)amine.

* * * * *